United States Patent
Suzuki et al.

(10) Patent No.: US 9,292,752 B2
(45) Date of Patent: Mar. 22, 2016

(54) IMAGE PROCESSING DEVICE AND IMAGE PROCESSING METHOD

(71) Applicant: FUJITSU LIMITED, Kawasaki-shi, Kanagawa (JP)

(72) Inventors: Genta Suzuki, Kawasaki (JP); Takahiro Matsuda, Isehara (JP)

(73) Assignee: FUJITSU LIMITED, Kawasaki (JP)

(*) Notice: Subject to any disclaimer, the term of this patent is extended or adjusted under 35 U.S.C. 154(b) by 271 days.

(21) Appl. No.: 13/903,154

(22) Filed: May 28, 2013

(65) Prior Publication Data

US 2014/0056487 A1 Feb. 27, 2014

(30) Foreign Application Priority Data

Aug. 24, 2012 (JP) ................................ 2012-184948

(51) Int. Cl.
*G06K 9/00* (2006.01)
*G06F 21/36* (2013.01)
*G06F 21/32* (2013.01)

(52) U.S. Cl.
CPC ............ *G06K 9/00892* (2013.01); *G06F 21/36* (2013.01); *G06F 21/32* (2013.01); *G06K 9/00221* (2013.01); *G06K 9/00288* (2013.01); *G06K 9/00885* (2013.01)

(58) Field of Classification Search
CPC ..... G06F 21/32; G06F 21/36; G06K 9/00288; G06K 9/00221; G06K 9/00885
See application file for complete search history.

(56) References Cited

U.S. PATENT DOCUMENTS

| 2007/0113099 A1* | 5/2007 | Takikawa et al. ............. 713/186 |
| 2007/0150745 A1* | 6/2007 | Peirce ..................... G06F 21/32 |
| | | 713/186 |
| 2007/0237355 A1 | 10/2007 | Song et al. |

(Continued)

FOREIGN PATENT DOCUMENTS

| JP | 2006-252225 | 9/2006 |
| JP | 2007-156577 | 6/2007 |
| JP | 2007-272896 | 10/2007 |
| WO | WO 2006128162 A2 * 11/2006 | ......... G06K 9/00885 |

OTHER PUBLICATIONS

Fabian Monrose, et al., "Keystroke dynamics as a biometric for authentication," Future Generation Computer Systems, Elsevier, vol. 16, 2000, pp. 351-359.

(Continued)

*Primary Examiner* — Stephen R Koziol
*Assistant Examiner* — Jonathan S Lee
(74) *Attorney, Agent, or Firm* — Oblon, McClelland, Maier & Neustadt, L.L.P.

(57) ABSTRACT

An image processing device includes a processor; and a memory which stores a plurality of instructions, which when executed by the processor, cause the processor to execute, acquiring a captured image; extracting first feature data and second feature data of a first user included in the image; calculating a first authentication decision value, which indicates a probability that the first feature data of the first user resembles first feature data of a second user; and authenticating the first user by using the first feature data or both the first feature data and the second feature data according to the first authentication decision value.

16 Claims, 10 Drawing Sheets

(56) References Cited

U.S. PATENT DOCUMENTS

| | | | |
|---|---|---|---|
| 2008/0101658 A1* | 5/2008 | Ahern | G06F 21/32 382/115 |
| 2009/0285488 A1* | 11/2009 | Li | 382/190 |
| 2011/0135165 A1* | 6/2011 | Wechsler et al. | 382/118 |
| 2011/0135166 A1* | 6/2011 | Wechsler et al. | 382/118 |
| 2013/0015946 A1* | 1/2013 | Lau et al. | 340/5.2 |
| 2013/0147972 A1* | 6/2013 | Niinuma et al. | 348/207.1 |
| 2013/0148850 A1* | 6/2013 | Matsuda et al. | 382/103 |
| 2013/0247174 A1* | 9/2013 | Wada | G06F 21/31 726/19 |
| 2014/0112553 A1* | 4/2014 | Yamaguchi | 382/118 |
| 2014/0250523 A1* | 9/2014 | Savvides | G06F 21/32 726/19 |

OTHER PUBLICATIONS

Alphan Altinok, et al., "Temporal Integration for Continuous Multimodal Biometrics," in Proc. Workshop on Multimodal User Authentication, 2003, 7 pages.

Terence Sim, et al., "Continuous Verification Using Multimodal Biometrics," IEEE Transactions on Pattern Analysis and Machine Intelligence, vol. 29, No. 4, Apr. 2007, pp. 687-700.

Koichiro Niinuma, et al., "Soft Biometric Traits for Continuous User Authentication", IEEE Transactions on Information Forensics and Security (TIFS), vol. 5, No. 4, Dec. 2010, pp. 771-780.

* cited by examiner

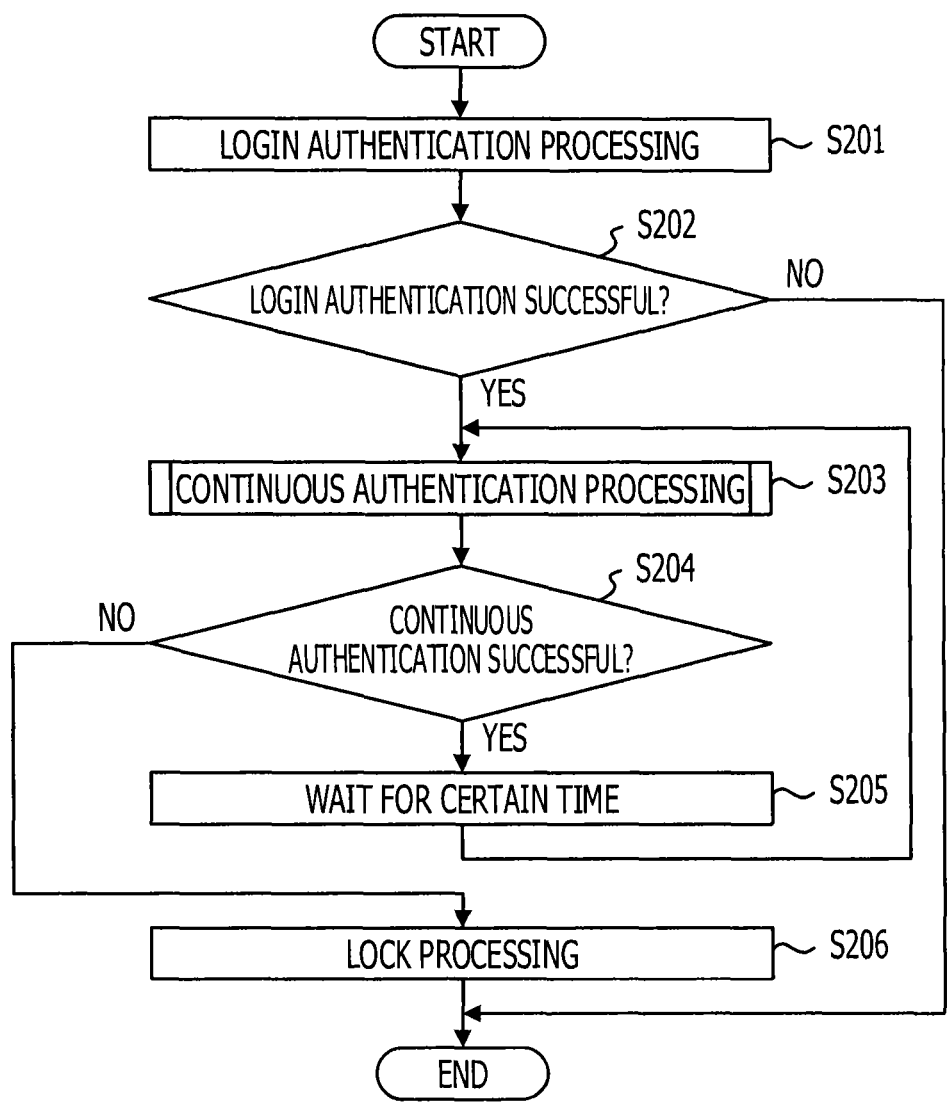

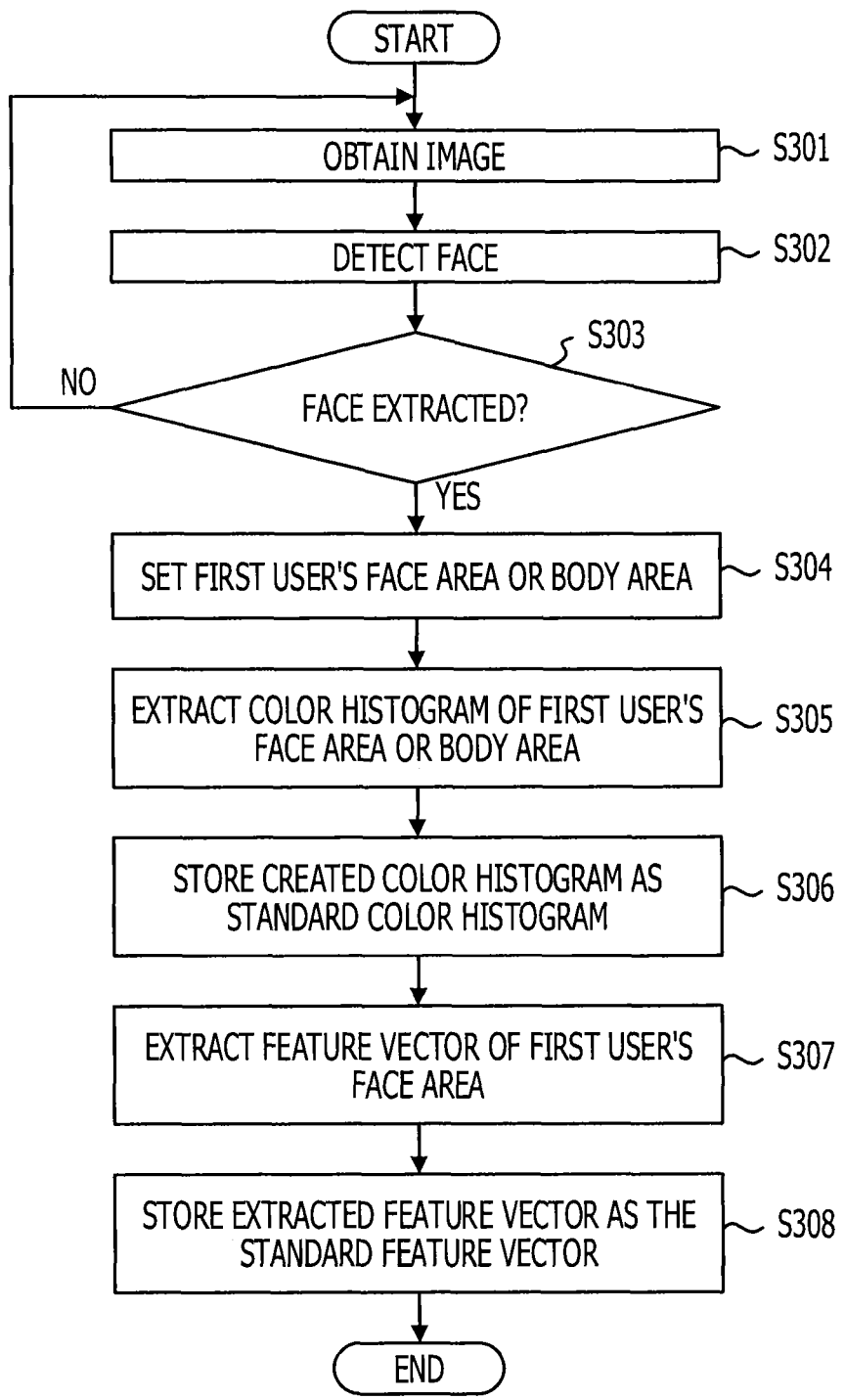

FIG. 4A
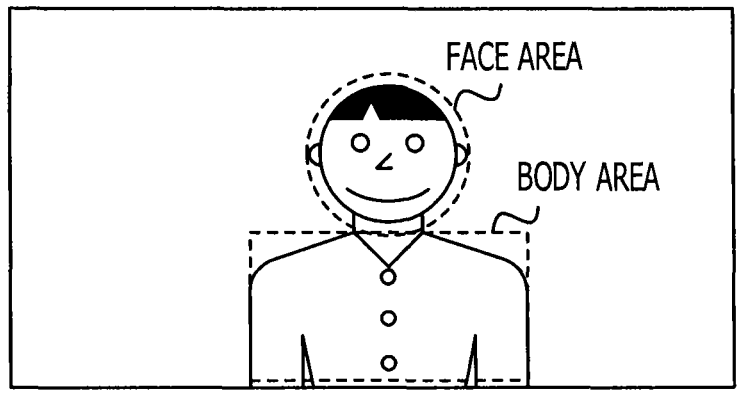
FIG. 4B
| | TARGET AREA | BODY AREA |
|---|---|---|
| AREA SHAPE AND POSITION INFORMATION | SHAPE | RECTANGULAR |
| | CENTER (x, y) | (200, 200) |
| | WIDTH | 200 |
| | HEIGHT | 150 |
| COLOR HISTOGRAM (R, G, B) | (15, 15, 15) | 0.01 |
| | (31, 31, 31) | 0.005 |
| | ... | ... |
| | (255, 255, 255) | 0.001 |
FIG. 4C
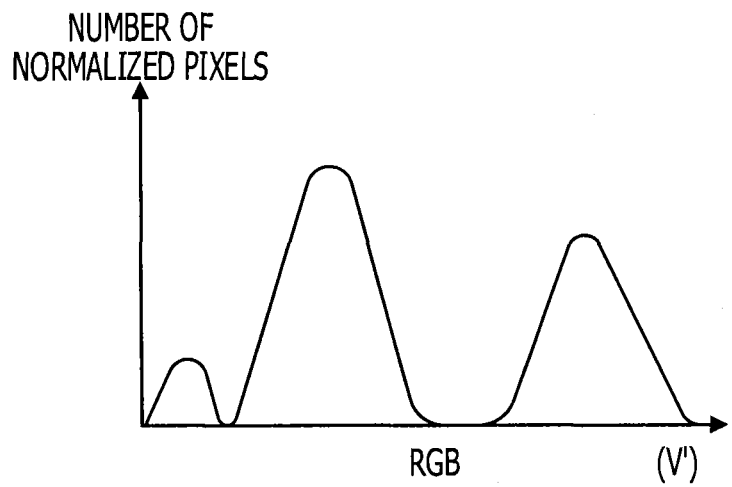

| AREA SHAPE AND POSITION INFORMATION | TARGET AREA | FACE AREA |  |
|---|---|---|---|
| | SHAPE | CIRCULAR | |
| | CENTER (x, y) | (200, 100) | |
| | WIDTH | 100 | |
| | HEIGHT | 150 | |
| FEATURE VECTORS | FEATURE VECTOR ID | POSITION (x, y) | DIRECTION (IN DEGREES) | FEATURE VECTOR (128 DIMENSIONS) |
| | 1 | (130, 70) | 24.3 | 0.441, 0.319, 0.929,... |
| | 2 | (150, 150) | 95.4 | 0.934, 0.713, 0.663,... |
| | ⋮ | ⋮ | ⋮ | ⋮ |
| | N | (235, 65) | 67.1 | 0.277, 0.393, 0.277,... |

| FACE AUTHENTICATION THRESHOLD (Th2) | FALSE ACCEPTANCE RATE (FARf) IN FACE AUTHENTICATION |
|---|---|
| 40 | 94.0% |
| 50 | 50.0% |
| 60 | 25.0% |
| 70 | 10.0% |
| 80 | 5.0% |
| 86 | 2.2% |
| 88 | 1.5% |
| 90 | 0.9% |
| 92 | 0.7% |
| 94 | 0.5% |
| 95 | 0.4% |
| 96 | 0.3% |

| FACE AUTHENTICATION THRESHOLD (Th2) | FALSE REJECTION RATE (FRRf) IN FACE AUTHENTICATION |
|---|---|
| 40 | 1.0% |
| 50 | 1.0% |
| 60 | 2.3% |
| 70 | 4.0% |
| 80 | 8.0% |
| 86 | 11.0% |
| 88 | 13.0% |
| 90 | 15.0% |
| 92 | 18.0% |
| 94 | 20.0% |
| 95 | 22.0% |
| 96 | 24.0% |

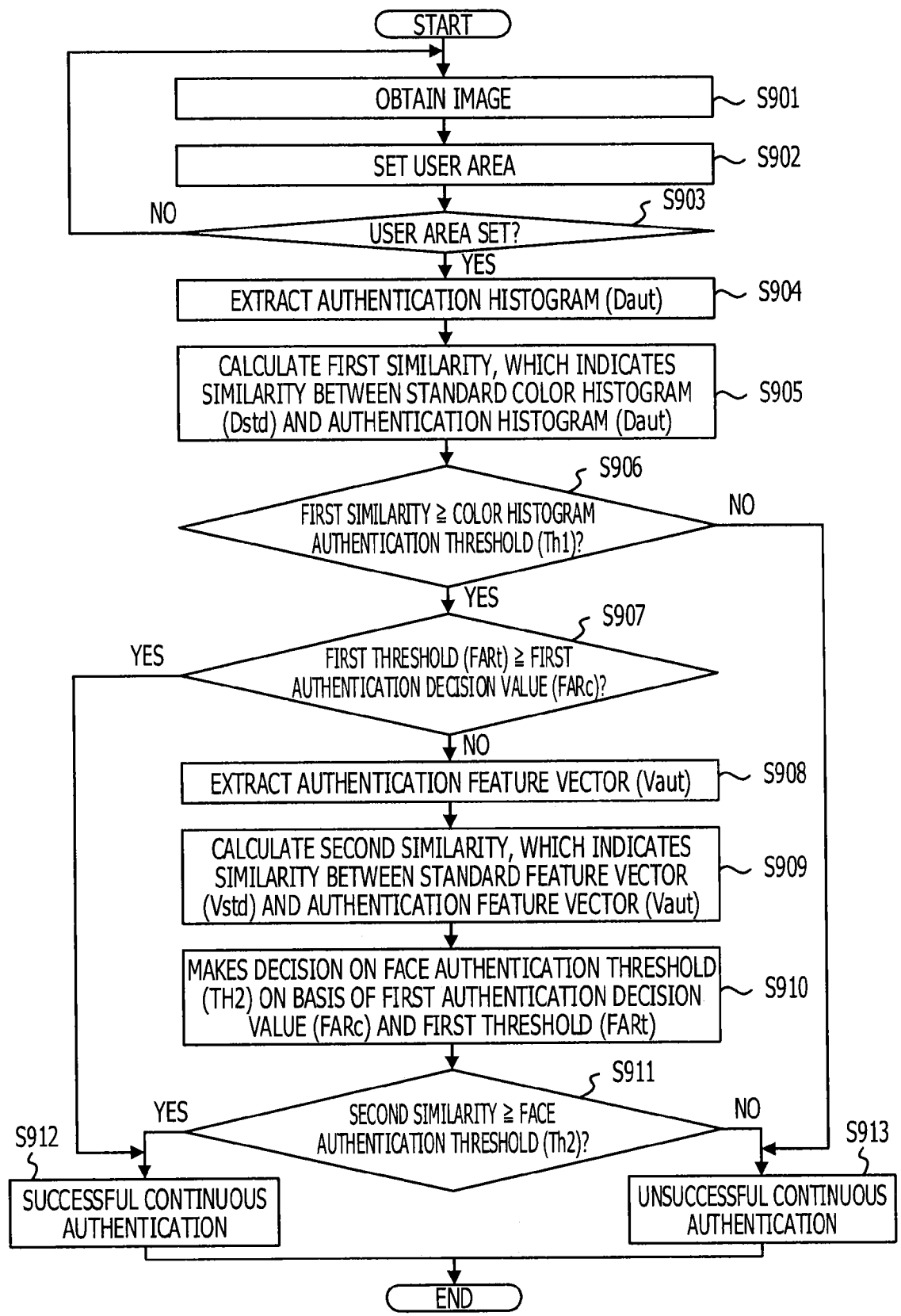

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2012-184948, filed on Aug. 24, 2012, the entire contents of which are incorporated herein by reference.

FIELD

The embodiments discussed herein are related to an image processing device and an image processing method that are used in, for example, continuous user authentication as well as a computer-readable recording medium in which an image processing program is stored.

BACKGROUND

As information devices have rapidly come into widespread use, a wide variety of types of information is retained in information devices in recent years. Accordingly, a current very important issue is to establish a security technology that, for example, suppresses information from leaking from information devices. In view of this situation, various authentication technologies such as, for example, password authentication, biometric authentication and card authentication have been proposed. However, many existing authentication technologies carry out authentication processing only at the time of login, so these technologies have the common problem that if, for example, a third party makes an unauthorized access to an information device while the normal user is apart from the location at which the information device is installed, the unauthorized access is difficult to detect.

To address the above problem, there are continuous authentication technologies in which authentication processing is continued for the user even after the user has logged in. These technologies are disclosed in, for example, F. Monrose and A. D. Rubin, "Keystroke dynamics as biometrics for authentication," Future Generation Comput. Syst., vol. 16, pp. 351-359, 2000, A. Altinok and M. Turk, "Temporal integration for continuous multimodal biometrics," in Proc. Workshop on Multimodal User Authentication, 2003, pp. 131-137, and T. Sim, S. Zhang, R. Janakiraman, and S. Kumar, "Continuous verification using multimodal biometrics," IEEE Trans. Pattern Anal. Mach. Intell., vol. 29, no. 4, pp. 687-700, April 2007. In typical continuous authentication, face authentication in which feature vectors are used is carried out. In face authentication, feature points, which are used as feature vectors in a face area corresponding to the user in an image, are stored in advance, and continuous authentication is achieved by detecting the user in the image according to a correspondence relationship between the stored feature points and feature points extracted during authentication.

Color histogram authentication, in which the color histogram of an image on which a user has been photographed is used, is also proposed in K. Niinuma, U. Park, A. K. Jain, "Soft Biometric Traits For Continuous User Authentication", IEEE Transactions on Information Forensics and Security (TIFS), Vol. 5, No. 4, pp. 771-780, 2, 2010. Color histogram authentication has an advantage that robust continuous authentication is possible even if the orientation of the user changes when compared with other methods in which face authentication or the like is used. In color histogram authentication, the color histogram of, for example, an area (such as a body area) corresponding to the user in the image is stored in advance. The body area of the user in the image is detected according to the similarity of an extracted color histogram with the stored color histogram, and continuous authentication is achieved by tracking the movement of the body area.

SUMMARY

In accordance with an aspect of the embodiments, an image processing device includes a processor; and a memory which stores a plurality of instructions, which when executed by the processor, cause the processor to execute, acquiring a captured image; extracting first feature data and second feature data of a first user included in the image; calculating a first authentication decision value, which indicates a probability that the first feature data of the first user resembles first feature data of a second user; and authenticating the first user by using the first feature data or both the first feature data and the second feature data according to the first authentication decision value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 2 is a flowchart in authentication processing executed by the continuous authentication apparatus;

FIG. 3 is a flowchart in initial registration processing executed by the image processing device;

FIG. 4A is conceptually illustrates a face area and a body area in color histogram extraction, FIG. 4B is a table illustrating an example of the data structure of a color histogram, and FIG. 4C conceptually illustrates a color histogram;

FIG. 9 is a flowchart in continuous authentication processing executed by the image processing device.

DESCRIPTION OF EMBODIMENTS

An example of an image processing device, an image processing method, and an image processing program in an embodiment will be described with reference to the drawings. This example does not limit the technology in the present disclosure.

Figure 1:
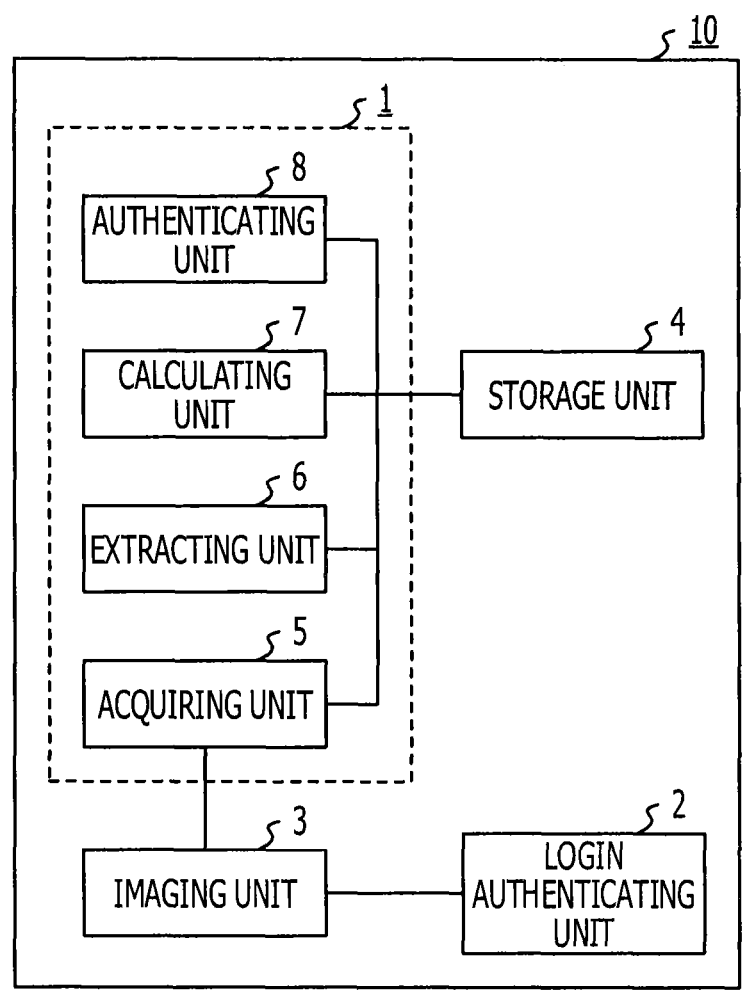
FIG. 1 is a functional block diagram of a continuous authentication apparatus in which an image processing device in an embodiment is included.

FIG. 1 is a functional block diagram of a continuous authentication apparatus 10 in which an image processing device 1 in an embodiment is included. In addition to the image processing device 1, the continuous authentication apparatus 10 includes a login authenticating unit 2, an imaging unit 3, and a storage unit 4. The image processing device 1 further includes an acquiring unit 5, an extracting unit 6, a calculating unit 7, and an authenticating unit 8.

The continuous authentication apparatus 10 authenticates a user who is using an information device such as, for example, a personal computer (PC) or a mobile terminal. The continuous authentication apparatus 10 may also be incorporated in or connected to a PC or mobile terminal used by the user. Alternatively, an information device itself may function as the continuous authentication apparatus 10. Furthermore, a computer connected to an information device through a communication line may function as the continuous authentication apparatus 10. Although, in the example in this embodiment, one continuous authentication apparatus 10 will be described by using client authentication type of continuous authentication as an example, the continuous authentication apparatus 10 is also applicable to server authentication type of continuous authentication in which a communication line is used. When server authentication type of continuous authentication is performed, for example, information used in login authentication processing, described later, and a user's image are received from a client. It suffices for a server to execute processing of functions provided by the image processing device 1 and notify the client of an authentication result.

The login authenticating unit 2 is, for example, a hardware circuit based on wired logic. The login authenticating unit 2 may be a functional module implemented by a computer program executed by the continuous authentication apparatus 10. The login authenticating unit 2 becomes operable to execute login authentication processing for the user by using any known authentication method (password authentication, biometric authentication, card authentication, or the like).

The imaging unit 3 is, for example, a charge-coupled device (CCD), a complementary metal oxide semiconductor (CMOS) camera, or another type of an imaging device. The imaging unit 3 captures, for example, an image including a face area or body area, which is a user area of a first user or a second user, at fixed intervals. The first user is a user having an authorized use right, who has undergone login authentication processing executed by the login authenticating unit 2 and is now using the information device. The second user is a user not having an authorized use right, who has not undergone login authentication processing. The second user may be a single user other than the first user or may refer to a plurality of users other than the first user.

The storage unit 4 is, for example, a semiconductor memory device such as a flash memory or a storage unit such as a hard disk drive (HDD) or optical disk drive. The storage unit 4 is not limited to the above types of storage units; it may be a random-access memory (RAM), a read-only memory (ROM), or the like. The storage unit 4 stores color histograms, feature vectors, and other various types of data calculated by the image processing device 1 on a demand basis. It is not a limitation that the storage unit 4 is included in the continuous authentication apparatus 10. For example, the above various types of data may be stored in a cache or a memory (not illustrated) provided in functional units in the image processing device 1. The storage unit 4 may also be disposed in an external device other than the continuous authentication apparatus 10, in which case the continuous authentication apparatus 10 or a communication unit (not illustrated) provided in or image processing device 1 is used so as to communicate with the external device through a communication line.

The acquiring unit 5 is, for example, a hardware circuit based on wired logic. The acquiring unit 5 may be a functional module implemented by a computer program executed by the image processing device 1. The acquiring unit 5 acquires an image, which has been captured by the imaging unit 3, at fixed intervals. The acquiring unit 5 may also receive images from other than the imaging unit 3. For example, the acquiring unit 5 may use the communication unit (not illustrated) to receive an image from an external device through a communication line. In this case, it is not a limitation that the imaging unit 3 is included in the continuous authentication apparatus 10; the imaging unit 3 may be included in the continuous authentication apparatus 10 or may not be included in the continuous authentication apparatus 10.

The extracting unit 6 is, for example, a hardware circuit based on wired logic. The extracting unit 6 may be a functional module implemented by a computer program executed by the image processing device 1. The extracting unit 6 receives an image from the acquiring unit 5, and extracts a color histogram, which is used as first feature data, from a first area, which is part of the user area of the first user or second user included in the image. The first area refers to the face area of the user or both the face area and body area of the user. The extracting unit 6 further extracts feature vectors, which is used as second feature data, from a second area, which is part of the user area included in the image. The second area refers to the face area of the user. It is not a limitation that the face area of the user in the first area and the face area of the user in the second area match; the two face areas may be independently set. The method by which the extracting unit 6 extracts the color histogram, which is used as the first feature data, and the feature vector, which is used as the second feature data, will be described later. For convenience of explanation, the first feature data extracted from the first area will be referred to below as the color histogram, and the second feature data extracted from the second area will be referred to below as the feature vector.

The calculating unit 7 is, for example, a hardware circuit based on wired logic. The calculating unit 7 may be a functional module implemented by a computer program executed by the image processing device 1. The calculating unit 7 receives the color histogram and feature vector of the first user or second user from the extracting unit 6.

It is not a limitation that the calculating unit 7 receives the color histogram of the second user from the extracting unit 6; the calculating unit 7 may receive it from another image processing device other than the image processing device 1. In an example in which a plurality of users (second users) are each individually using the continuous authentication apparatus 10, in which the image processing device 1 is included, in an office, the calculating unit 7 may receive the color histograms of the second users through communication lines. In another example in which a plurality of users share a single continuous authentication apparatus 10, upon completion of login authentication processing, the calculating unit 7 may extract the color histogram of the first user. When the first user executes logout processing, the calculating unit 7 may store the color histogram of the first user in the cache or memory (not illustrated) in the extracting unit 6 or in the storage unit 4 as the color histogram of the second user. In another example in which the first user is using the continuous authentication apparatus 10, when the imaging unit 3 captured the second user present in the vicinity, the calculating unit 7 may receive the color histogram of the second user that has been extracted by the extracting unit 6.

The calculating unit 7 uses the color histogram of the first user and the color histogram of the second user to calculate a first authentication decision value, which indicates the probability that the color histogram of the first user resembles the color histogram of the second user. The technical meaning of the first authentication decision value and the detailed flow of processing executed by the calculating unit 7 to calculate the first authentication decision value will be described later.

The authenticating unit 8 is, for example, a hardware circuit based on wired logic. The authenticating unit 8 may be a functional module implemented by a computer program executed by the image processing device 1. The authenticating unit 8 receives the first authentication decision value calculated by the calculating unit 7 and authenticates the first user by using the color histogram or both the color histogram and the feature vector according to the first authentication decision value. A continuous authentication flow executed by the authenticating unit 8 will be described later in detail.

FIG. 2 is a flowchart in authentication processing executed by the continuous authentication apparatus 10. Authentication processing illustrated in FIG. 2 is executed when the user starts to use the continuous authentication apparatus 10 or an information device connected to (or incorporated in) the continuous authentication apparatus 10. First, the login authenticating unit 2 performs login authentication processing (step S201). Any known authentication method (password authentication, biometric authentication, card authentication, or the like) may be used as the authentication method used in this login authentication processing. The login authenticating unit 2 then decides whether the user has been confirmed as the first user, that is, a normal user, in the login authentication processing (step S202).

If the login authenticating unit 2 makes a negative decision in the login authentication (the result in step S202 is No), the continuous authentication apparatus 10 terminates the login authentication processing. Thus, it is possible to suppress the second user, who is a user other than the first user, that is, a normal user, from using the continuous authentication apparatus 10 or the information device connected to the continuous authentication apparatus 10. If the login authenticating unit 2 makes a positive decision in the login authentication (the result in step S202 is Yes), the login authenticating unit 2 activates the image processing device 1, after which the image processing device 1 performs continuous authentication processing (step S203). A detailed flow in the continuous authentication processing in step S203 will be described later.

If the image processing device 1 makes a negative decision in the continuous authentication (the result in step S204 is No), lock processing is performed for the continuous authentication apparatus 10 or the information device connected to the continuous authentication apparatus 10 (step S206). In lock processing, the login authenticating unit 2 is made ready for re-execution of login authentication processing by, for example, temporarily performing logout processing. Alternatively, the information device may be made completely inoperable and then the manager or another person may be notified of an alarm. If the image processing device 1 makes a positive decision in the continuous authentication (the result in step S204 is Yes), the image processing device 1 waits for a certain time (step S205), after which the image processing device 1 repeatedly executes the continuous authentication processing in step S203. The certain time in step S205 may be set to any value in consideration of, for example, robustness desired by the continuous authentication apparatus 10. For example, the certain time may be set to 30 seconds or 60 seconds.

After the user has been confirmed as the first user, that is, a normal user, in the above login authentication processing, the user is allowed to use the continuous authentication apparatus 10 or the information device connected to the continuous authentication apparatus 10 while the image processing device 1 is continuing the continuous authentication processing.

Next, a detailed flow of the continuous authentication processing will be described, which is executed by the image processing device 1 in step S203 in the authentication processing illustrated in FIG. 2. FIG. 3 is a flowchart in initial registration executed by the image processing device 1. In step S203 in the authentication processing illustrated in FIG. 2, initial registration processing illustrated in FIG. 3 is first executed.

The acquiring unit 5 first obtains an image captured by the imaging unit 3 (step S301). The extracting unit 6 receives the image from the acquiring unit 5 and detects the first user's face included in the image (step S302). To detect the face, any known method may be used: an exemplary method is the Haar classifier disclosed in P. Viola and M. Jones, "Rapid object detection using a boosted cascade of simple features," in Proc. IEEE Computer Vision and Pattern Recognition, pp. I-511-I-518, 2001. The extracting unit 6 decides whether the first user's face has been appropriately extracted (step S303).

If appropriateness is denied in the extraction of the first user's face extraction by the imaging unit 3 because, for example, the first user's face has not been oriented to the front of the imaging unit 3 during the imaging by the imaging unit 3 (the result in step S303 is No), the imaging unit 3 performs imaging again, after which the acquiring unit 5 obtains an image (step S301). If appropriateness is denied a certain number of times in extraction of the first user's face extraction in step S303, the initial registration processing may be completed, after which the lock processing in step S206 in FIG. 2 may be executed. If appropriateness is affirmed in extraction of the first user's face extraction in FIG. 3 (the result in step S303 is Yes), the extracting unit 6 sets a certain shape (circular shape, elliptical shape, or rectangular shape, for example) corresponding to the first user's face as the face area (step S304). The extracting unit 6 also sets another certain shape (circular shape, elliptical shape, or semicircular shape, for example) corresponding to the first user's body as the body area (step S304). The body area may have a horizontal length twice that of the face area and a vertical length equal to that of the face area.

Figures 5A, 5B:
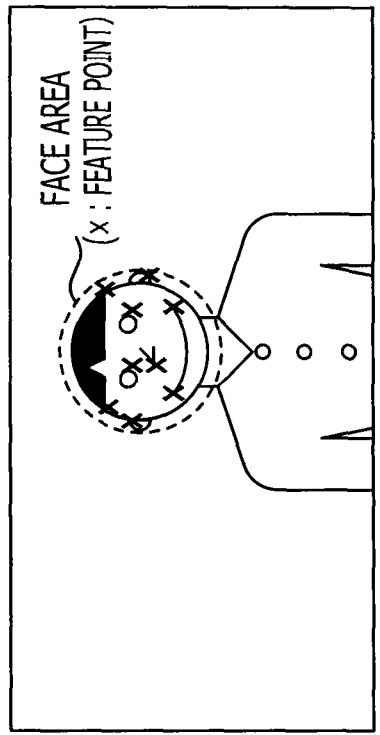
FIG. 5A conceptually illustrates a face area in feature vector extraction.
FIG. 5B is a table illustrating an example of the data structure of feature vector information in which feature points are used.

FIG. 4A is conceptually illustrates a face area and a body area in color histogram extraction. In the example in FIG. 4A, a face area in a circular shape and a body area in a rectangular shape are set. As illustrated in FIG. 4A, when the head is included in the face area, the color of the user's hair is also included as feature data, so it becomes possible to improve precision with which similarity is decided by using a color histogram. The storage unit 4 may set only either of the face area and body area as the first area in color histogram extraction. In view of the uniqueness of the user's clothes, both the face area and the body area may be set as the first area in color histogram extraction. FIG. 5A conceptually illustrates a face area in feature vector extraction. In the example in FIG. 5A, a face area in a circular shape is set as a user detection area in feature vector extraction.

In FIG. 3, the extracting unit 6 extracts the color histogram of the first user's face area or body area that has been set in step S304 (step S305). When pixels in the image have 256 levels for each of R, G, and B, for example, the extracting unit 6 divides each component of the RGB color space into 16 segments for target pixels in the face area or body area in the image, resulting in 4096 levels (=16×16×16). When the pixel value of R is taken as Vr (0 to 255), bin Vr', which is obtained by dividing R by 16, is represented by the equation below.

$$Vr' = Vr \times 16 \div 256 \quad \text{(Equation 1)}$$

When the pixel value of G is taken as Vg (0 to 255), bin Vg', which is obtained by dividing G by 16, is calculated by the same way as Vr' above. When the pixel value of B is taken as Vb (0 to 255), bin Vb', which is obtained by dividing B by 16, is calculated by the same way as Vr' above. Therefore, their detailed explanation will be omitted. The extracting unit 6 uses calculated bin Vr', bin Vg', and bin Vb' to calculate a pixel level V', which is one of the 4096 levels.

$$V' = Vr' \times 16 \times 16 + Vg' \times 16 + Vb'$$

For each of the 4096 levels, the extracting unit 6 takes an array of the sum of pixels in the face area or body area as the color histogram. FIG. 4B is a table illustrating an example of the data structure of a color histogram. Although, the example in FIG. 4B illustrates the data structure of the color histogram of the body area, the data structure of the color histogram of the face area is also similar, so its detailed explanation will be omitted. As illustrated in FIG. 4B, the extracting unit 6 may store the shape of the body area, positional information about the shape, and other supplementary information in the table as area shape and position information on a demand basis. FIG. 4B indicates that the shape of the body area is rectangular, its center is at coordinates (200, 200) with, for example, the upper left end of the image taken as the origin, the width is equivalent to 200 pixels, and the height is equivalent to 150 pixels. The color histogram (R, G, B) in FIG. 4B is represented by ratios of colors that fall within the numeral ranges of the above bin Vr', bin Vg', and bin Vb'. For example, histogram data (15, 15, 15) illustrated in FIG. 4B indicates that the ratio of the number of pixels in each color (R, G, B) that falls into the numerical range of (0, 0, 0) to (15, 15, 15) to the total number of pixels is 0.01 (=1%). In color histogram extraction, the extracting unit 6 may use another color space (HSV color space, for example) other than the RGB color space.

FIG. 4C conceptually illustrates a color histogram. As illustrated in FIG. 4C, in consideration that when the areas of color histograms to be compared with each other have different sizes (the number of pixels included in the areas), processing to calculate similarity between color histograms with different area sizes becomes complex, the extracting unit 6 may create a normalized color histogram in which the number of pixels is normalized with respective to any standard area size.

In FIG. 3, the extracting unit 6 stores the color histogram extracted in step S305 in the cache or memory (not illustrated) in the authenticating unit 8 or the storage unit 4 as a standard color histogram (step S306). The standard color histogram may be referred to as first standard feature data.

The extracting unit 6 extracts, from the first user's face area, a feature vector by using, for example, an Eigenface (Eigen) method in which the main component of the face data of the user is analyzed with respect to Eigenface data prepared in advance (step S307), the method being disclosed in L. Sirovich and M. Kirby, "Low-dimensional procedure for the characterization of human faces", Journal of the Optical Society of America A 4 (3): 519-524, 1987. The extracting unit 6 stores the feature vector in the cache or memory (not illustrated) in the authenticating unit 8 or the storage unit 4 as a standard feature vector (step S308), completing the initial registration processing. The standard feature vector may be referred to as second standard feature data.

In addition to the above Eigenface method, the extracting unit 6 may use a Harris corner detector or the like to extract a feature point and then extract a feature vector from the extracted feature point in step S307 in FIG. 3. In this method, the feature point extracted from the face area in step S307 may be any one of feature points for which a feature vector is calculated for each feature point called a descriptor. For example, the scale invariant feature transform (SIFT) feature point, the speeded-up robust features (SURF) feature point, or another known feature point may be used. As an example of the method of extracting the SIFT feature point, the method disclosed in U.S. Pat. No. 6,711,293 may be used. As an example of the SURF extraction method, the method disclosed in H. Bay, et al. "SURF: Speeded Up Robust Features", Computer Vision AND Image Understanding, Vol. 110, No. 3, pp. 346-359, 2008 may be used.

FIG. 5A illustrates an example of the positions of the feature points extracted in the face area. The position of each feature point is defined as a distance (x, y) from a reference position (upper left end of the image, for example) in the image, the reference point being taken as the origin. The direction is defined as the direction of the feature point with respect to the reference position. The feature vector is defined as a set of a plurality of feature data items (128 dimensions, for example) including colors and a shape. FIG. 5B is a table illustrating an example of the data structure of feature vector information in which feature points are used. As illustrated in FIG. 5B, the extracting unit 6 may store the shape of the face area, positional information about the shape, and other supplementary information in the table as area shape and position information on a demand basis. The example in FIG. 5B indicates that the shape of the face area is circular, its center is at coordinates (200, 100) with the upper left end of the image taken as the origin, the width is equivalent to 100 pixels, and the height is equivalent to 150 pixels. The feature vectors illustrated in FIG. 5B each have the ID of a feature vector extracted by the extracting unit 6, the position and direction of the vector in the image, and other information. The direction is defined as the direction of the feature point with respect to the reference position. The feature vector is defined as a set of a plurality of feature data items (128 dimensions, for example) including colors and a shape. Other various known feature data may be used as feature vectors besides the feature data obtained in the above method. Although, in the example in this embodiment, feature vectors are extracted from the face area of the user, they may be extracted from any other area.

Figure 6:
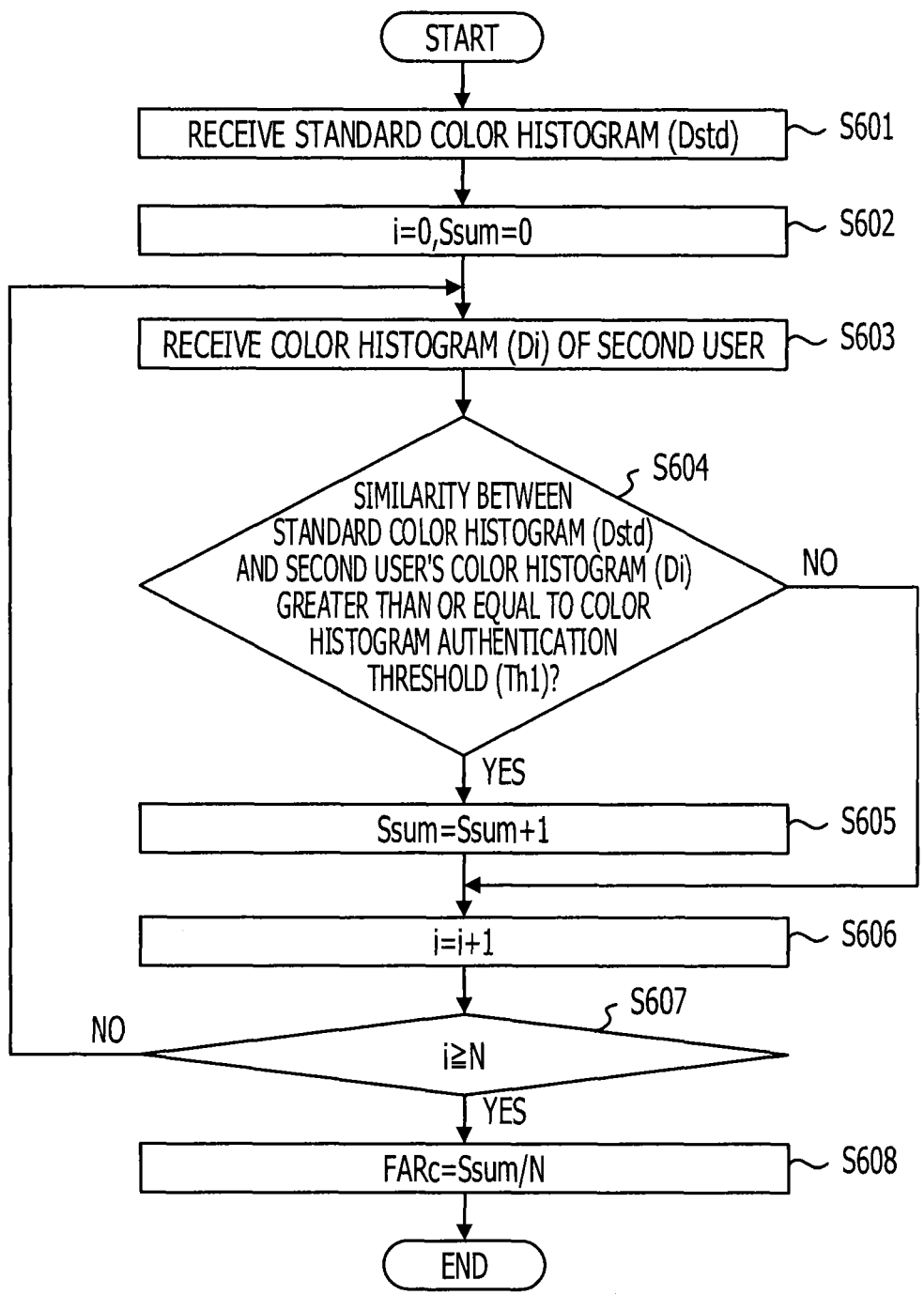
FIG. 6 is a flowchart in calculation processing in which a first authentication decision value is calculated by a calculating unit.

Next, a flow to calculate the first authentication decision value will be described. After the initial registration processing illustrated in FIG. 3 has been complete, the first authentication decision value is used in the continuous authentication processing executed by the image processing device 1 in step S203 in the authentication processing illustrated in FIG. 2. FIG. 6 is a flowchart in calculation processing in which the first authentication decision value is calculated by the calculating unit 7. The calculating unit 7 receives the standard color histogram (Dstd) stored in step S306 in FIG. 3 from, for example, the authenticating unit 8 (step S601). The calculating unit 7 sets, to 0, the number (i) of acquired color histograms (Di) of a user other than the first user, who has undergone login authentication processing executed by the login authenticating unit 2 and has an authorized use right; the user other than the first user is a second user who has not undergone login authentication processing and thereby does not have an authorized use right. The calculating unit 7 also sets a similarity sum (Ssum) to 0 (step S602), the similarity sum being a total number of second user's color histograms (Di) that resemble the standard color histogram (Dstd).

The calculating unit 7 receives the color histogram (Di) of the second user (step S603). As described above, in an example in which a plurality of users (second users) are each individually using the continuous authentication apparatus 10, in which the image processing device 1 is included, in an office, the calculating unit 7 may receive the color histograms (Di) of the second users through communication lines in step S603. Furthermore, the calculating unit 7 may identify a plurality of continuous authentication apparatuses 10 and second users in the office by using a network domain, IP addresses, and other information.

In another example in which a plurality of users share a single continuous authentication apparatus 10, when the first user executes logout processing, the calculating unit 7 may receive the color histogram of the first user from the extracting unit 6 as the color histogram (Di) of a second user in step S603. In this case, an ID that uniquely identifies the user and a date and time of collection may be added to the color histogram (Di) as supplementary information. Since the color histogram varies depending on the clothes of the user, if a date and time of collection is added as supplementary information, it becomes possible to use color histograms in a specific period and thereby to improve robustness.

If the imaging unit 3 captures an image including a second user present in the vicinity while the first user is using the continuous authentication apparatus 10, the calculating unit 7 may receive the second user's color histogram (Di) that has been extracted by the extracting unit 6 in step S603. The second user's color histogram (Di) is calculated in processing similar to, for example, processing in steps S301 to S305 in FIG. 3.

The calculating unit 7 calculates the similarity between the standard color histogram (Dstd) and the second user's color histogram (Di) and decides whether the similarity is larger than or equal to a color histogram authentication threshold (Th1), which is a prescribed threshold (step S604). Processing to calculate the similarity between the standard color histogram (Dstd) and the second user's color histogram (Di) will be now described. Various known methods may be used to calculate the similarity between color histograms, some of which are, for example, methods in which the Bhattacharyya distance is used. To calculate the similarity by using the Bhattacharyya distance, a calculation method may be used that is disclosed in Kailath T. "The Divergence AND Bhattacharyya Distance Measures in Signal Selection", IEEE Transactions on Communication Technology 15 (1) pp. 52-60, 1967. When a normalized color histogram has been created as illustrated in FIG. 4C, the similarity ρ is calculated by the equation below in which a normalized color histogram of the standard color histogram (Dstd) is taken as pu and a normalized color histogram of the second user's color histogram (Di) is taken as pu.

$$\rho = \sum_{u=1} \sqrt{pupu} \qquad \text{(Equation 3)}$$

When using a combination of the color histogram similarity in the face area and the color histogram similarity in the body area is used to make a decision, the calculating unit 7 may calculate a total similarity Stotal by using, for example, the equation below in which the color histogram similarity in the face area is taken as Sface and the color histogram similarity in the body area is taken as Sbody.

$$Stotal = t \times Sface + (1-t) \times Sbody \qquad \text{(Equation 4)}$$

where t, which is a weight coefficient for the similarity Sface of the color histogram in the face area, is at least 0 and at most 1.

If the calculated similarity of the color histogram is larger than or equal to the prescribed color histogram authentication threshold (Th1), the calculating unit 7 decides that the second user's color histogram (Di) resembles the standard color histogram (Dstd) (the result in step S604 is Yes) and increments the similarity sum (Ssum) by one (step S605). If the calculated similarity of the color histogram is smaller than the prescribed color histogram authentication threshold (Th1), the calculating unit 7 decides that there is no similarity (the result in step S604 is No), causing the processing to proceed to step S606.

The calculating unit 7 increments the number (i) of acquired color histograms (Di) by one (step S606). The calculating unit 7 then decides whether the number (i) of acquired color histograms (Di) is larger than or equal to a prescribed acquisition count (N) predetermined for the number (i) of acquired color histograms (Di) (step S607). The prescribed acquisition count (N) is a constant that may be set to a desired value. In an example in which a plurality of users (second users) are each individually using the continuous authentication apparatus 10, in which the image processing device 1 is included, in an office, the number of second users may taken as the prescribed acquisition count (N). Alternatively, if, for example, the number (i) of acquired color histograms (Di) has not been incremented for a certain period of time, the number (i) of acquired color histograms (Di) may be taken as the prescribed acquisition count (N). The prescribed acquisition count (N) may be, for example, 100.

If the number (i) of acquired color histograms (Di) is smaller than the prescribed acquisition count (N) (the result in step S607 is No), the calculating unit 7 repeatedly executes the processing in steps S602 to S607. If the number (i) of acquired color histograms (Di) is larger than or equal to the prescribed acquisition count (N) (the result in step S607 is Yes), the calculating unit 7 calculates the first authentication decision value (FARc), which indicates the probability that the color histogram of the first user resembles the color histogram of the second user (step S608).

The first authentication decision value (FARc) may be calculated by using the similarity sum (Ssum) and prescribed acquisition count (N) as in the equation below.

$$FARc(\%) = Ssum/N \times 100 \qquad \text{(Equation 5)}$$

The first authentication decision value (FARc) has the same meanings as the false acceptance rate in color histogram authentication. In other words, the first authentication decision value (FARc) indicates a probable ratio of second users having a color histogram similar to that of the first user to a plurality of second users from which color histograms have been extracted. The larger the number of second users having a color histogram similar to that of the first user is, the larger the value of the first authentication decision value (FARc) is. If there is no second user having a color histogram similar to that of the first user, the value of the first authentication decision value (FARc) is 0. A time at which the first authentication decision value (FARc) is calculated may be set to a desired value according to robustness desired by the continuous authentication apparatus 10. For example, the calculating unit 7 may calculate the first authentication decision value (FARc) once at least every 12 or 24 hours. Thus, it is possible to follow changes in color histograms that are caused by changes of users' clothes.

The calculating unit 7 stores the first authentication decision value (FARc) calculated in step S608 in, for example, the cache or memory (not illustrated) in the authenticating unit 8 or the storage unit 4, completing the first authentication decision value (FARc) calculation processing.

Now, a technical significance of complex authentication, in which face authentication based on feature vectors and color histogram authentication in the example in this embodiment, will be described. First, if the false acceptance rate (FARt) desired by the continuous authentication apparatus 10 is 1% and the first authentication decision value (FARc) is smaller than 1%, this indicates that the color histogram of the first user is sufficiently unique in an environment in which the continuous authentication apparatus 10 is used. That is, only color histogram authentication is enough to authenticate the first user. If the first authentication decision value (FARc) is larger than or equal to 1%, this indicates that the color histogram of the first user is not sufficiently unique in the environment in which the continuous authentication apparatus 10 is used. That is, it is not appropriate to authenticate the first user only in color histogram authentication; it is desirable to perform face authentication based on feature vectors together with color histogram authentication.

In an exemplary face authentication method in which feature vectors are used, the authenticating unit 8 compares authentication feature points including authentication feature vectors extracted from the first user's face area during continuous authentication with reference feature points including the standard feature vector. For example, the authenticating unit 8 selects any one feature point from the reference feature points.

The authenticating unit 8 searches for a correspondence between the one selected reference feature point and each of the authentication feature vectors. As a search method, matching processing based on an ordinary corresponding point search may be used. After repeating this search for all combinations of the reference feature points and authentication feature points, the authenticating unit 8 authenticates the first user according to the number of feature points for which a correspondence has been found and prescribed face authentication threshold (Th2).

It is thought that some feature points corresponding to the background area are included in the extracted feature points, depending on the actual face position of the first user at the time when the feature points are extracted. In view of this, when a decision is made on the face area, reliability may be assigned to each of the extracted feature points. For example, reliability may be assigned so that as a distance from the center of the feature points becomes shorter, higher reliability is assigned. When only feature points with high reliability are used or weights are assigned to individual feature points, it is possible to improve precision with which a decision is made on the face area. When Eigenface data is used, the authenticating unit 8 may also authenticate the first user according to the similarity between the standard feature vector and each authentication feature vector extracted during authentication and to the prescribed face authentication threshold (Th2).

Figures 7A, 7B:
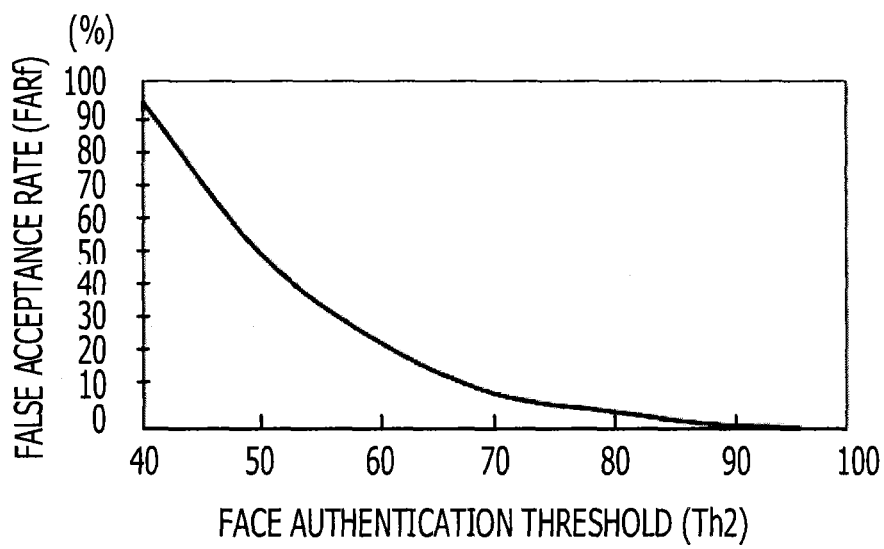
FIG. 7A is a correspondence table indicating a relationship between a face authentication threshold (Th2) based on feature vectors and a false acceptance rate (FARf) in face authentication.
FIG. 7B is a graph illustrating the relationship.
Figures 8A, 8B:
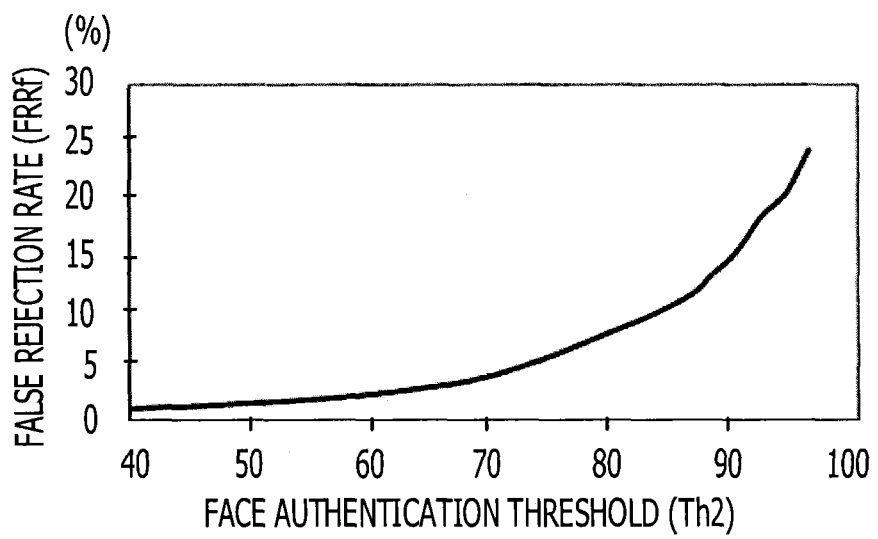
FIG. 8A is a correspondence table indicating a relationship between the face authentication threshold (Th2) based on feature vectors and a false rejection rate (FRRf) in face authentication.
FIG. 8B is a graph illustrating the relationship.

FIG. 7A is a correspondence table indicating a relationship between the face authentication threshold (Th2) based on feature vectors and a false acceptance rate (FARf) in face authentication, and FIG. 7B is a graph illustrating the relationship. FIG. 8A is a correspondence table indicating a relationship between the face authentication threshold (Th2) based on feature vectors and a false rejection rate (FRRf) in face authentication, and FIG. 8B is a graph illustrating the relationship. As illustrated in FIGS. 7B and 8B, there is a tradeoff between the false acceptance rate (FARf) and false rejection rate (FRRf) in face authentication; when one of them is raised, the other falls and vice versa. In the tables in FIGS. 7A and 8A, for example, when the face authentication threshold (Th2) is 90, the false acceptance rate (FARf) is 0.9% and the false rejection rate (FRRf) is 15%. When the face authentication threshold (Th2) is 70, the false acceptance rate (FARf) is 10% and the false rejection rate (FRRc) is 4%.

A false acceptance rate (FARc) in color histogram authentication has the same meaning as the first authentication decision value (FARc) described above. As seen from the above equation in (Equation 5), a range of values that the FARc may take is 0% to 100%. A false rejection rate (FRRc) in color histogram authentication, at which the registered user is rejected, is very low as long as there is no disturbance such as changes of the user's clothes and changes in illumination; it is, for example, 0.1% or less. Unlike face authentication based on feature vectors, the false acceptance rate (FARc) and the false rejection rate (FRRc) are independent of each other.

The false rejection rate in an authentication method in which only face authentication based on feature vectors is used will be now described. To achieve a false rejection rate demanded by the continuous authentication apparatus 10 (FARt=1%), the face authentication threshold (Th2) is expected to be 90 as illustrated in FIGS. 7A and 8A. In this case, the false rejection rate (FRRf) is 15%.

Next, a false rejection rate in an authentication method in which the color histogram authentication and feature vector authentication in the example in this embodiment are combined will be described. In complex authentication in which a plurality of authentication methods are combined and an AND condition is taken, the false acceptance rate (FAR) in the complex authentication is represented by the product of the false acceptance rates (FARs) in all authentication methods. The false rejection rate (FRR) is represented by the sum of the false rejection rates (FRRs) in all authentication methods. When, for example, the continuous authentication apparatus 10 demands a false acceptance rate (FARt) of 1%, the false acceptance rate (FARt) demanded by the continuous authentication apparatus 10 is represented by using the false acceptance rate in color histogram authentication (first authentication decision value (FARc)) described above and the false acceptance rate (FARE) in face authentication in the equation below. The false acceptance rate (FARf) in face authentication may be referred to as a second authentication decision value.

$$FARt = FARc + FARf \quad \text{(Equation 6)}$$

If, for example, the false acceptance rate (first authentication decision value (FARc)) in color histogram authentication is 20% (in which case, one of five users has a similar color histogram), the equation in (Equation 6) above is rewritten as follows.

$$FARf = FARt/FARc \quad \text{(Equation 7)}$$

Thus, the demanded false acceptance rate (FARf) in face authentication becomes 5%. To achieve a false acceptance rate (FARf) of 5% in face authentication, the face authentication threshold (Th2) is set to 80 as illustrated in FIG. 7k That is, in the example in this embodiment, the threshold in face authentication dynamically changes according to the first authentication decision value and other factors. When Th2 is 80, the false rejection rate (FRRf) in face authentication is 8% as illustrated in FIG. 8A. To achieve a false acceptance rate (FARt) of 1% demanded by the continuous authentication apparatus 10, the false rejection rate (FRR) is the sum (8.1%) of a false rejection rate (FRRf) of 8% in face authentication and a false rejection rate (FRRc) of 0.1% in color histogram, indicating that availability is significantly improved while robustness is being maintained.

As described above, in the authentication method in the example in this embodiment, it becomes possible to improve both robustness and availability in continuous authentication by calculating the first authentication decision value, which is the probability that the first user's color histogram resembles the second user's color histogram, from the second user's color histogram and combining color histogram authentication and feature vector authentication, in which the authentication threshold is changed according to the first authentication decision value.

FIG. 9 is a flowchart in continuous authentication processing executed by the image processing device 1. This flowchart indicates a detailed flow of processing in step S202 in FIG. 2. It is assumed that at the start of the processing flow in FIG. 9, the standard color histogram (Dstd) and standard feature vector (Vstd) have been extracted in the flow in FIG. 3, and first authentication decision value (FARc) has been calculated in the flow in FIG. 6.

The acquiring unit 5 obtains an image captured by the imaging unit 3 (step S901). Then, the extracting unit 6 receives the image from the acquiring unit 5 and sets the face area and body area, which are the user area of the first user included in the image (step S903). The face area and body area may be set in the same way as in steps S302 to S304. In FIG. 9, the extracting unit 6 decides whether the user area of the first user has been appropriately set (step S903).

If appropriateness is denied in the setting of the user area of the first user because, for example, the first user's face has not been oriented to the front of the imaging unit 3 during the imaging by the imaging unit 3 (the result in step S903 is No), the imaging unit 3 performs imaging again, after which the acquiring unit 5 obtains an image (step S901). If appropriateness is denied a certain number of times in the setting of the user area of the first user in step S903, the lock processing in step S206 in FIG. 2 may be performed. If appropriateness is affirmed in the setting of the user area in FIG. 9 (the result in step S903 is Yes), the extracting unit 6 extracts an authentication histogram (Daut), which is used for authentication, from the user area (step S904). The authentication histogram (Daut) may be extracted in the same way as in step S305 in FIG. 3.

In FIG. 9, the calculating unit 7 calculates a first similarity, which indicates the similarity between the standard color histogram (Dstd) and the authentication histogram (Daut) (step S905). The first similarity may be calculated in the same way as in step S604 in FIG. 6.

If the first similarity is smaller than the prescribed color histogram authentication threshold (Th1) (the result in step S906 is No), the authenticating unit 8 decides that the continuous authentication has failed (step S913), in which case the image processing device 1 terminates the continuous authentication processing. The color histogram authentication threshold (Th1) may be referred to as a second threshold.

If the first similarity is larger than or equal to the prescribed color histogram authentication threshold (Th1) (the result in step S906 is Yes), the authenticating unit 8 decides whether a first threshold (FARt), which indicates a false acceptance rate demanded by the continuous authentication apparatus 10, is larger than or equal to the first authentication decision value (FARc) (step S907). If the first threshold (FARt) is smaller than the first authentication decision value (the result in step S907 is Yes), the authenticating unit 8 decides that the continuous authentication has succeeded (step S912), in which case the image processing device 1 terminates the continuous authentication processing.

If the first threshold (FARt) is smaller than the first authentication decision value (FARc) (the result in step S907 is No), the authenticating unit 8 extracts an authentication feature vector (Vaut), which is used for authentication, from the face area, which is part of the user area, (step S908). The authentication feature vector (Vaut) may be extracted in the same way as in step S307 in FIG. 3.

In FIG. 9, the calculating unit 7 calculates a second similarity, which indicates the similarity between the standard feature vector (Vstd) and the authentication feature vector (Vaut) (step S909). The known method described above may be used to calculate the second similarity.

The authenticating unit 8 makes a decision on the face authentication threshold (Th2) according to the first authentication decision value (FARc) and first threshold (FARt) (step S910). The authenticating unit 8 may make this decision by using, for example, the equation in (Equation 7) above and the table illustrated in FIG. 7A. The face authentication threshold (Th2) may be referred to as a third threshold.

The authenticating unit 8 decides whether the second similarity calculated in step S909 is larger than or equal to the face authentication threshold (Th2) (step S911). If the second similarity is larger than or equal to the face authentication threshold (Th2) (the result in step S911 is Yes), the authenticating unit 8 decides that the continuous authentication has succeeded (step S912), in which case the image processing device 1 terminates the continuous authentication processing. If the second similarity is smaller than the face authentication threshold (Th2) (the result in step S911 is No), the authenticating unit 8 decides that the continuous authentication has failed (step S913), in which case the image processing device 1 terminates the continuous authentication processing.

Figure 10:
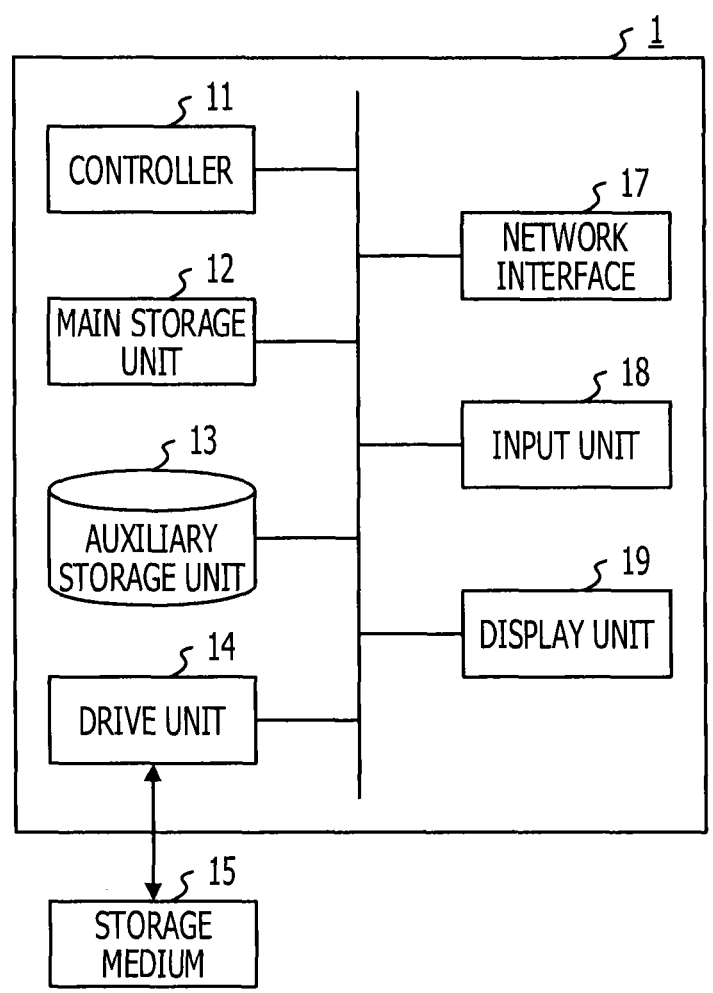
FIG. 10 is a block diagram illustrating the structure of hardware components included in a computer that functions as the image processing device in an embodiment.

FIG. 10 is a block diagram illustrating the structure of hardware components included in a computer that functions as the image processing device 1 in an embodiment. As illustrated in FIG. 10, the image processing device 1 includes a controller 11, a main storage unit 12, an auxiliary storage unit 13, a drive unit 14, a network interface 17, an input unit 18, and a display unit 19. These components are interconnected through a bus so that data may be transmitted and received among them.

The controller 11 is a central processing unit (CPU) that controls components and also calculates and processes data in the computer. The controller 11 also functions as a computing unit that executes programs stored in the main storage unit 12 and auxiliary storage unit 13; the controller 11 receives data from the input unit 18 or a storage device, performs calculation and processing on the received data, and outputs the resulting data to the display unit 19, the storage device, and the like.

The main storage unit 12 is a ROM, a RAM or, another storage device; the main storage unit 12 stores or temporarily saves an operating system (OS), which is basic software executed by the controller 11, programs such as application software, and data.

The auxiliary storage unit 13 is an HDD or another storage device; the auxiliary storage unit 13 stores data related to the application software and the like.

The drive unit 14 reads out a program from a storage medium 15, an example of which is a flexible disk, and installs the read-out program in the auxiliary storage unit 13.

A prescribed program is stored in the storage medium 15. The program stored in the storage medium 15 is installed in the image processing device 1 through the drive unit 14. The installed program is made executable by the image processing device 1.

The network interface 17 is an interface between the image processing device 1 and peripheral units having a communication feature, the peripheral units being connected to the network interface 17 through a local area network (LAN), a wide area network (WAN), or another network that is created by using data transmission paths such as wired links and/or wireless links.

The input unit 18 has a keyboard that includes cursor keys, numeric keys, various types of functional keys, and the like and also has a mouse, slide pad, and other components that are used to, for example, select keys on the display screen of the display unit 19. The input unit 18 also functions as a user interface used by the user to send manipulation commands to the controller 11 and enter data.

The display unit 19, which is formed with a cathode ray tube (CRT), a liquid crystal display (LCD) or the like, provides a display according to display data supplied from the controller 11.

The image processing method described above may be implemented by a program executed by a computer. When the program is installed from a server or the like and is executed by the computer, it becomes possible to achieve the image processing method.

It is also possible to achieve the image processing method described above by recording the program in the storage medium 15 and having a computer or mobile terminal read the storage medium 15. The storage medium 15 may be any of various types of recording media. Examples of the storage medium 15 include compact disc-read-only memories (CD-ROMs), flexible disks, magneto-optic disks, and other recording media that optically, electrically, or magnetically record information. Other examples include ROMs, flash memories, and other semiconductor memories that electrically record information.

The physical layouts of the components of the apparatuses illustrated in FIGS. 1 and 10 are not limited to the physical layouts illustrated in FIGS. 1 and 10. That is, the specific form of distribution and integration of these components is not limited to the forms illustrated in FIGS. 1 and 10. Part or all of the components may be functionally or physically distributed or integrated in a desired unit. All processing described in the example in this embodiment may be implemented by having a personal computer, a workstation, or another type of computer execute a program prepared in advance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
   a processor; and
   a memory which stores a plurality of instructions, which when executed by the processor, cause the processor to:
   acquire a captured image;
   extract first feature data and second feature data of a first user included in the captured image;
   calculate a first authentication decision value, which indicates a probability that the first feature data of the first user resembles first feature data of a second user; and
   authenticate the first user by selectively using either one of the first feature data of the first user and both the first feature data and the second feature data of the first user according to the first authentication decision value, wherein
   when the first authentication decision value is smaller than a first threshold, the processor is to authenticate the first user according to a first similarity that indicates a similarity between the first feature data of the first user and first standard feature data, the first standard feature data being prestored;
   when the first authentication decision value is larger than or equal to the first threshold, the processor is to authenticate the first user according to the first similarity and a second similarity that indicates a similarity between the second feature data of the first user and second standard feature data, the second standard feature data being prestored; and
   the first threshold corresponds to a false acceptance rate that is permitted by the authentication.

2. The device according to claim 1, wherein:
   the first feature data of the first user is a color histogram, and
   the second feature data of the first user is a feature vector.

3. The device according to claim 1, wherein:
   the second user is included in the captured image; and
   the calculation is to acquire the first feature data of the second user, based on the extraction, or to acquire the first feature data of the second user from another image processing device.

4. The device according to claim 1, wherein when the first authentication decision value is smaller than the first threshold, and when the first similarity is larger than or equal to a second threshold, which is used to authenticate the first user according to the first similarity, the processor is to authenticate the first user.

5. The device according to claim 1, wherein, when the first authentication decision value is larger than or equal to the first threshold, the processor is to determine a second authentication decision value according to the first threshold and the first authentication decision value, the second authentication decision value being used to calculate a third threshold, which is used to authenticate the first user according to the second similarity.

6. The device according to claim 5, wherein when the first authentication decision value is larger than or equal to the first threshold, and when the first similarity is larger than or equal to a second threshold, which is used to authenticate the first user according to the first similarity, and the second similarity is larger than or equal to the third threshold, the processor is to authenticate the first user.

7. The device according to claim 5, wherein a value obtained by multiplying the first authentication decision value by the second authentication decision value is smaller than or equal to the first threshold.

8. The device according to claim 1, wherein the extraction is to extract the first feature data of the first user from a face area or a body area and also extract the second feature data of the first user from the face area.

9. An image processing method comprising:
   acquiring a captured image;
   extracting first feature data and second feature data of a first user included in the captured image;

calculating, by a computer processor, a first authentication decision value, which indicates a probability that the first feature data of the first user resembles first feature data of a second user; and authenticating the first user by selectively using either one of the first feature data of the first user and both the first feature data and the second feature data of the first user according to the first authentication decision value, wherein when the first authentication decision value is smaller than a first threshold, the authenticating is to authenticate the first user according to a first similarity that indicates a similarity between the first feature data of the first user and first standard feature data, the first standard feature data being prestored;

when the first authentication decision value is larger than or equal to the first threshold, the authenticating is to authenticate the first user according to the first similarity and a second similarity that indicates a similarity between the second feature data of the first user and second standard feature data, the second standard feature data being prestored; and the first threshold corresponds to a false acceptance rate that is permitted by the authenticating.

10. The method according to claim 9, wherein:
the first feature data of the first user is a color histogram; and
the second feature data of the first user is a feature vector.

11. The method according to claim 9, wherein:
the second user is included in the image; and
the calculating is to acquire the first feature data of the second user, based on the extracting, or to acquire the first feature data of the second user from another image processing device.

12. The method according to claim 9, wherein when the first authentication decision value is smaller than the first threshold, and when the first similarity is larger than or equal to a second threshold, which is used to authenticate the first user according to the first similarity, the authenticating is to authenticate the first user.

13. The method according to claim 9, wherein when the first authentication decision value is larger than or equal to the first threshold, the authenticating is to determine a second authentication decision value according to the first threshold and the first authentication decision value, the second authentication decision value being used to calculate a third threshold, which is used to authenticate the first user according to the second similarity.

14. The method according to claim 13, wherein when the first authentication decision value is larger than or equal to the first threshold, and when the first similarity is larger than or equal to a second threshold, which is used to authenticate the first user according to the first similarity, and the second similarity is larger than or equal to the third threshold, the authenticating is to authenticate the first user.

15. The method according to claim 13, wherein a value obtained by multiplying the first authentication decision value by the second authentication decision value is smaller than or equal to the first threshold.

16. A non-transitory computer-readable storage medium storing an image processing program that causes a computer to execute a process comprising:

acquiring a captured image;

extracting first feature data and second feature data of a first user included in the captured image;

calculating a first authentication decision value, which indicates a probability that the first feature data of the first user resembles first feature data of a second user; and authenticating the first user by selectively using either one of the first feature data of the first user and both the first feature data and the second feature data of the first user according to the first authentication decision value, wherein when the first authentication decision value is smaller than a first threshold, the authenticating is to authenticate the first user according to a first similarity that indicates a similarity between the first feature data of the first user and first standard feature data, the first standard feature data being prestored;

when the first authentication decision value is larger than or equal to the first threshold, the authenticating is to authenticate the first user according to the first similarity and a second similarity that indicates a similarity between the second feature data of the first user and second standard feature data, the second standard feature data being prestored; and the first threshold corresponds to a false acceptance rate that is permitted by the authenticating.

\* \* \* \* \*